United States Patent
Xu et al.

(10) Patent No.: US 10,243,801 B2
(45) Date of Patent: Mar. 26, 2019

(54) METHOD AND SYSTEM FOR DISTRIBUTIVE FLOW CONTROL AND BANDWIDTH MANAGEMENT IN A NETWORK

(71) Applicants: Jun Xu, Takoma Park, MD (US); Rob Torres, New Market, MD (US); Zili Qian, Germantown, MD (US)

(72) Inventors: Jun Xu, Takoma Park, MD (US); Rob Torres, New Market, MD (US); Zili Qian, Germantown, MD (US)

(73) Assignee: Hughes Networking Systems, LLC, Germantown, MD (US)

( * ) Notice: Subject to any disclaimer, the term of this patent is extended or adjusted under 35 U.S.C. 154(b) by 88 days.

(21) Appl. No.: 15/199,452

(22) Filed: Jun. 30, 2016

(65) Prior Publication Data
US 2018/0006892 A1    Jan. 4, 2018

(51) Int. Cl.
*H04L 12/24*    (2006.01)
*H04B 7/185*    (2006.01)
(Continued)

(52) U.S. Cl.
CPC ..... *H04L 41/0896* (2013.01); *H04B 7/18578* (2013.01); *H04L 45/02* (2013.01);
(Continued)

(58) Field of Classification Search
CPC combination set(s) only.
See application file for complete search history.

(56) References Cited

U.S. PATENT DOCUMENTS

| 6,418,139 B1 * | 7/2002 | Akhtar | .................... H04L 29/06 370/225 |
| 8,705,357 B2 | 4/2014 | Torres et al. | |

(Continued)

OTHER PUBLICATIONS

Scott et al., "TCP Congestion in Shared Satellite Environments", MILCOM 2002 Proceedings, Oct. 2002.*
(Continued)

*Primary Examiner* — Alex Skripnikov
*Assistant Examiner* — Sharmin Chowdhury
(74) *Attorney, Agent, or Firm* — Capitol City TechLaw; Jasbir Singh

(57) ABSTRACT

A method and system for distributive flow control and bandwidth management in networks is disclosed. The method includes: providing multiple Internet Protocol (IP) Gateways (IPGWs) that each have a maximum send rate and one or more sessions with associated throughput criteria, wherein each IPGW performs flow control by limiting information flows by the respective maximum send rate and throughput criteria; providing multiple Code Rate Organizers (CROs) that each have a bandwidth capacity, wherein each CRO performs bandwidth allocation of its respective bandwidth capacity to one or more IPGWs of the multiple IPGWs; interconnecting the multiple IPGWs with the multiple CROs; and performing bandwidth management across the multiple CROs and IPGWs. In the method, an IPGW of the multiple IPGWs provides flow control across a plurality of the CROs of the multiple CROs, and a CRO of the multiple CROs allocates bandwidth to a plurality of the IPGWs of the multiple IPGWs.

25 Claims, 6 Drawing Sheets

(51) Int. Cl.
  *H04L 12/751* (2013.01)
  *H04L 12/801* (2013.01)
  *H04L 12/813* (2013.01)
  *H04L 12/815* (2013.01)
  *H04L 12/911* (2013.01)

(52) U.S. Cl.
  CPC .............. *H04L 47/12* (2013.01); *H04L 47/20* (2013.01); *H04L 47/22* (2013.01); *H04L 47/782* (2013.01); *H04L 47/827* (2013.01)

(56) References Cited

U.S. PATENT DOCUMENTS

| | | |
|---|---|---|
| 8,929,217 B2 | 1/2015 | Torres et al. |
| 9,276,665 B1 * | 3/2016 | Johnson ................ H04B 7/2041 |
| 2013/0135996 A1 * | 5/2013 | Torres ................ H04L 41/5022 |
| | | 370/230 |
| 2013/0136004 A1 * | 5/2013 | Torres ................ H04B 7/18584 |
| | | 370/236 |
| 2015/0188623 A1 * | 7/2015 | Angeletti ............ H04B 7/2041 |
| | | 455/13.3 |
| 2016/0050014 A1 | 2/2016 | Agarwal |
| 2016/0072574 A1 | 3/2016 | Xu et al. |

OTHER PUBLICATIONS

International Search Report of corresponding PCT application PCT/US2017/039864, dated Oct. 5, 2017.

* cited by examiner

METHOD AND SYSTEM FOR DISTRIBUTIVE FLOW CONTROL AND BANDWIDTH MANAGEMENT IN A NETWORK

FIELD

The present teachings disclose methods and system to perform flow control and bandwidth management for multiple Internet Protocol (IP) Gateways (IPGWs) interconnected with multiple Code Rate Organizers (CROs) for an outroute stream system with improved network resource utilization, superior stability and flexibility in configuring the network resources. In some embodiments, the present teachings are backward compatible with a conventional Multi-IPGW Single-CRO system.

BACKGROUND

In a shared access network, for example, a broadband satellite network, users may connect to the Internet via a shared wireless channel and a network gateway. The shared network channel provides physical access to the network for a certain number of terminals, but has a limited capacity, for example, by certain spectrum, modulation and coding schemes. The network gateway performs tasks, such as, setting up connection, traffic management and quality of service (QoS) provisioning. The network gateway also has capacity limitations, for example, due to its processing capability.

In a conventional configuration of the shared access system, such as, a forward link stream of DVB-S2 channel, one access channel may be connected to several network gateways while a network gateway only connects to the one shared channel. In this system, user terminals sharing one access channel may be associated with different network gateways. Bandwidth allocation performs the task of assigning the channel capacity to individual network gateways based on the respective demand, for example, due to backlog. During congestion, when the shared channel cannot serve all the requested demand, the network gateway may push back user traffic back to the core network.

U.S. Pat. Nos. 8,929,217 and 8,705,357 disclose performing flow control and bandwidth allocation. However, these patents do not support an interconnected IPGW-CRO resource pool as described herein. Other prior arts, for example, bandwidth management for terminal groups, are for terminal groups with certain common features and do not do not support an interconnected IPGW-CRO resource pool as described herein.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a flexible network configuration to allow one access channel to be connected to multiple network gateways while one network gateway is connected to multiple access channels. Such an interconnected configuration may improve network spectrum utilization, load balancing, mobility management, and Quality of Service (QoS) provisioning. In some embodiments, the IPGWs may not be collocated. In some embodiments, the CROs may be servicing different physical resources, such as, IPGWs, satellites, wireless access channels or wireline access channels. The present teachings bring new challenges to traffic flow control and bandwidth management.

A method for distributive flow control and bandwidth management in networks is disclosed. The method includes: providing multiple Internet Protocol (IP) Gateways (IP-GWs) that each have a maximum send rate and one or more sessions with associated throughput criteria, wherein each IPGW performs flow control by limiting information flows by the respective maximum send rate and throughput criteria; providing multiple Code Rate Organizers (CROs) that each have a bandwidth capacity, wherein each CRO performs bandwidth allocation of its respective bandwidth capacity to one or more IPGWs of the multiple IPGWs; interconnecting the multiple IPGWs with the multiple CROs; and performing bandwidth management across the multiple CROs and IPGWs. In the method, an IPGW of the multiple IPGWs provides flow control across a plurality of the CROs of the multiple CROs, and a CRO of the multiple CROs allocates bandwidth to a plurality of the IPGWs of the multiple IPGWs.

A system for distributive flow control and bandwidth management in networks is disclosed. The system includes: multiple Internet Protocol (IP) Gateways (IPGWs) that each have a maximum send rate and one or more sessions with associated throughput criteria, wherein each IPGW performs flow control by limiting information flows by the respective maximum send rate and throughput criteria; multiple Code Rate Organizers (CROs) that each have a bandwidth capacity, wherein each CRO performs bandwidth allocation of its respective bandwidth capacity to one or more IPGWs of the multiple IPGWs; and a bandwidth manager to perform bandwidth management across the multiple CROs and IPGWs. In the system, the multiple IPGWs are interconnected with the multiple CROs, and an IPGW of the multiple IPGWs provides flow control across a plurality of the CROs of the multiple CROs, and a CRO of the multiple CROs allocates bandwidth to a plurality of the IPGWs of the multiple IPGWs.

A method for distributive flow control and bandwidth management in networks is disclosed. The method includes: providing multiple network gateways that each have a maximum send rate and one or more sessions with associated throughput criteria, wherein each network gateway performs flow control by limiting information flows by the respective maximum send rate and throughput criteria; providing multiple access channels that each have a bandwidth capacity, wherein each access channel performs bandwidth allocation of its respective bandwidth capacity to one or more network gateways of the multiple network gateways; interconnecting the multiple network gateways with the multiple access channels; and performing bandwidth management across the multiple access channels and network gateways. In the method, a network gateway of the multiple network gateways provides flow control across a plurality of the access channels of the multiple access channels, and an access channel of the multiple access channels allocates bandwidth to a plurality of the network gateways of the multiple network gateways.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
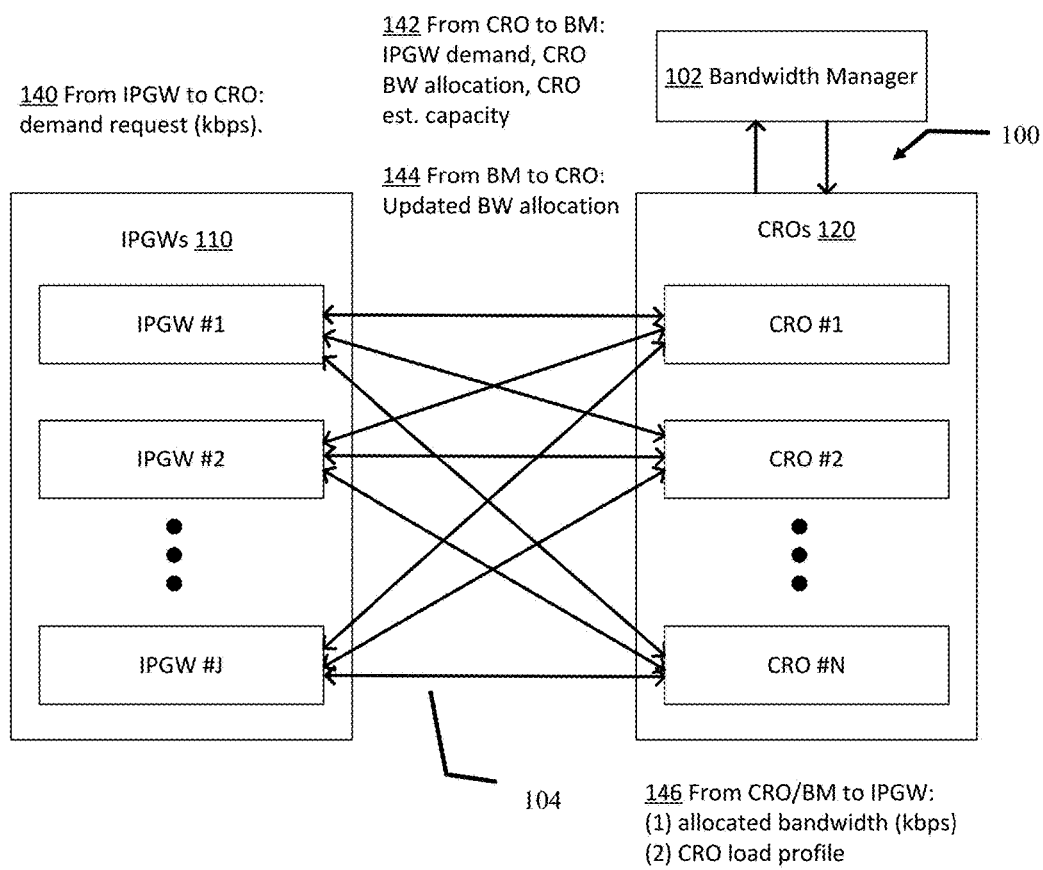
FIG. 1 illustrates a Multi-IP Gateway (IPGW) Multi-Code Rate Organizer (CRO) System including a Bandwidth Manager (BM) according to various embodiments.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Although some features may be described with respect to individual exemplary embodiments, aspects need not be limited thereto such that features from one or more exemplary embodiments may be combinable with other features from one or more exemplary embodiments.

The present teachings disclose a flexible network configuration for connecting one access channel to multiple network gateways, while also connecting one network gateway to multiple access channels. Such an interconnected configuration may achieve improvement on network spectrum utilization, load balancing, mobility management, and Quality of Service (QoS) provisioning. However, the interconnected system brings new challenges to traffic flow control and bandwidth management.

The present teachings disclose methods and systems of flow control and bandwidth management for a shared access network system with interconnected multiple access channels and multiple network gateways to provide improved network utilization, QoS provisioning and flexibility in network configuration.

According to various embodiments, a satellite network with multiple spot beams under the coverage of one or multiple satellites may be configured as an interconnected network. In such a satellite network, a communication shared access channel from a ground station to a terminal is referred to as outroute or outroute stream; conversely, a communication channel from the terminal to the gateway is referred to as inroute. A network gateway, for example, an Internet Protocol (IP) Gateway (IPGW), may be located at the ground station. The IPGW is a processing component that performs traffic management and routing for multiple terminals that share an Outroute stream. A Code Rate Organizer (CRO) is a component that, for example, manages modulation and coding rate on an outroute stream. Thus, sometimes an Outroute stream is referred to as a CRO for convenience. Terminals connected to the interconnected network may be disposed/dispersed over coverage areas of one or multiple spot beams provided by one of multiple satellites in the satellite network. A Bandwidth Manager (BM) may be used for performing bandwidth management across CROs and IPGWs.

In the present disclosure, the prior art system, namely a system with a single CRO connected to multiple IPGWs, is referred to as a Multi-IPGW Single-CRO system. In the present disclosure, the improved interconnected system, namely a system with multiple IPGWs connected to multiple CROs, is referred to as a Multi-IPGW Multi-CRO system.

The present teachings disclose methods for the flow control and bandwidth management of a Multi-IPGW Multi-CRO system on the Outroute direction. In particular, there may be X CROs and Y IPGWs where X and Y are greater than one (1), forming an X-by-Y model. X CROs may be in multiple beams of one or multiple satellites. Y IPGWs may be at one or multiple ground locations. Such an X-by-Y system may be fully or partially interconnected, i.e., all X CROs may or may not be connected to all Y IPGWs, and vice visa. In exemplary embodiments, the present teachings allow dynamic configuration of the X-by-Y system, in other words, the values of X and Y may be varied not only at system provisioning but also while the interconnected network is operational. In some embodiments, the IPGWs may not be collocated. In some embodiments, the CROs may be servicing different physical resources, such as, IPGWs, satellites, wireless access channels or wireline access channels.

In exemplary embodiments, the present teachings disclose a Distributive Flow Control (DFC) method and system where the CRO performs independent bandwidth allocation while the IPGW performs independent flow control (e.g., scheduling and TCP congestion control) and administrative coordination (e.g., association) on all terminals. In exemplary embodiments, the present teachings disclose a centralized bandwidth management and reallocation scheme performed by a Bandwidth Manager (BM) to avoid overallotment and balance bandwidth allocation on the IPGW. In exemplary embodiments, the present teachings disclose a dynamic topology updating scheme to reflect the run-time interconnection of CROs and IPGWs to facilitate BM's bandwidth allocation.

The present teachings provide flexibility for flow control and bandwidth allocation with differentiated criteria for mixed application, such as, regular data service and guaranteed bandwidth provisioning. The present teachings are adaptive for various user groups, such as consumer, enterprise and mobility, in sharing the same network resource. The present interconnected Multi-CRO Multi-IPGW system has superior performance. The present Multi-CRO Multi-IPGW system improves network resource utilization and flexibility as compared to a Multi-IPGW Single-CRO system. The present teachings also allow the network to dynamically configure and update the interconnection of IPGWs and CROs. Thus, the methods and systems of the present teachings perform flow control and bandwidth management in an interconnected Multi-IPGW Multi-CRO system with improved network resource utilization, superior stability and flexibility in configuring network resources. In exemplary embodiments, the methods and systems of the present teachings are backward compatible with the conventional Multi-IPGW Single-CRO system.

In exemplary embodiments, the present teachings may be used for the outroutes (forward direction channels) for a satellite network. In exemplary embodiments, the present teachings may be used for the inroutes (return direction channels) of a satellite network. In exemplary embodiments, the present teachings may be used for any networks where the overall network is partitioned into multiple resource pools and each resource pool consists of multiple wireless or wireline access channels and network traffic management gateways with both having throughput limits.

In exemplary embodiments, the present teachings may be used for any system with multiple independent shared physical channels, where one or more upper layers may utilize some subset of those physical channels; a given remote device is associated with at least one of those physical channels at a given time; and multiple remote devices may be self or network directed to utilize the physical channels dynamically to optimize the loading of and distribution of remotes across those physical channels.

The Multi-IP Gateway (IPGW) Multi-Code Rate Organizer (CRO) System Model

FIG. 1 illustrates a Multi-IP Gateway (IPGW) Multi-Code Rate Organizer (CRO) System including a Bandwidth Manager (BM) according to various embodiments.

The present teachings covers flow control and bandwidth management for multiple IPGWs connected to multiple outroutes (CROs) (Multi-IPGW Multi-CRO). In a DVB-S2 system, the Outroute refers to a shared access wireless channel that multiplexes multiple terminals for shared transmission. The system may be configured with one CRO per outroute or multiple CROs per outroute. Due to timesharing mechanism, when multiple CROs share one outroute, each CRO would have a dedicated portion of the available symbol rate.

A Multi-IPGW Multi-CRO system 100 may include a bandwidth manager 102, multiple IPGWs 110, and multiple CROs 120 that are connected via interconnections 104. In the Multi-IPGW Multi-CRO system 100, each IPGW is connected to multiple CROs while each CRO still receives data flows from multiple IPGWs. In this system, each IPGW may provide individual traffic flow management on the data fed to each CRO; and each CRO performs bandwidth allocation across IPGWs based on certain criteria.

One of the challenges for a Multi-IPGW Multi-CRO system 100 is flow control. As terminals from different CROs may be associated with the same IPGW, the IPGW may provide administrative functions on all terminals, and respective flow control and traffic management on individual CRO branches.

A Multi-IPGW Multi-CRO system 100 may be limited by the IPGW and CRO capacities. As each IPGW has a configured throughput limit or maximum send rate, namely Committed Information Rate (CIR), and because a CRO makes independent decision on its bandwidth allocation to an IPGW, the aggregate bandwidth of an IPGW obtained from multiple CROs may exceed its configured CIR. The excess aggregate bandwidth of the IPGW wastes a CROs' bandwidth. The CIR may be set for many reasons, such as, processing capability, business policy, beam bandwidth, or the like.

In some embodiments, these challenges may be addressed via a Distributive Flow Control mechanism and a Bandwidth Manager (BM) 102 that may communicate with all CROs to complete bandwidth allocation. The BM 102 may be centralized. The centralized bandwidth management may enhance or optimize CRO and IPGW utilization. In exemplary embodiments, optimized CRO utilization may ensure that an IPGW is not assigned bandwidth that the IPGW cannot use, especially, when another IPGW could have used it. In exemplary embodiments, optimized IPGW utilization may ensure that when the bandwidth is available across all CROs, the IPGW may send at full CIR even when one or more CROs cannot provide the IPGW with its demanding throughput.

The present teachings define functions of flow control and bandwidth management for a Multi-IPGW Multi-CRO system 100 providing internet service to individual users. Individual flow control modules in the IPGW permit the IPGW to perform flow control on a per CRO basis. The centralized bandwidth manager 102 may coordinate bandwidth partitioning of one CRO across multiple IPGWs to meet throughput criteria.

In exemplary embodiments, each IPGW may have separate data management modules to control traffic flow to one of the CROs associated with the IPGW itself. An IPGW periodically generates demand requests 140 to each CRO based on a needed-bandwidth calculation for each of its flow control module. In exemplary embodiments, each demand request 140 is independent of demand requests to other CROs from the same IPGW and may not necessarily be limited by the IPGW's CIR. In some embodiments, the IPGW may periodically send each demand request 140 to the associated CRO. In some embodiments, the IPGW may periodically group and aggregate demand requests 140 by the associated terminal sessions, and send the aggregate demand request 140 to the associated CRO.

In exemplary embodiments, upon receiving the demand requests 140 from IPGWs 110, the CROs 120 perform bandwidth allocation. When the Bandwidth Manager 102 is present, the CRO makes an independent bandwidth allocation, passing its own bandwidth allocation 142 together with IPGWs' bandwidth demand requests 140 to the Bandwidth Manager 102 for an adjusted allocation decision. The Bandwidth Manager 102 sends the adjusted bandwidth allocations 144 to the corresponding CROs with the latter forwarding the adjusted bandwidth allocations 146 to the IPGWs. In some embodiments, the adjusted bandwidth allocations 146 may include a CRO load profile for the IPGW. When the Bandwidth Manager 102 is not present, the CRO may continue to operate by making an independent bandwidth allocation that is not subject to an adjustment by the BM 102.

In exemplary embodiments, the interconnections 104 between the CROs and IPGWs may be dynamic. For example, the interconnections 104 may by altered or change over time, for example, due to reconfiguration, a failed component or the like.

Distributive Flow Control

In exemplary embodiments, a process for dynamically updating the connection topology to make the distributive flow control and centralized bandwidth allocation adaptive to the dynamic interconnection is disclosed.

The System of Distributive Flow Control

Figure 2:
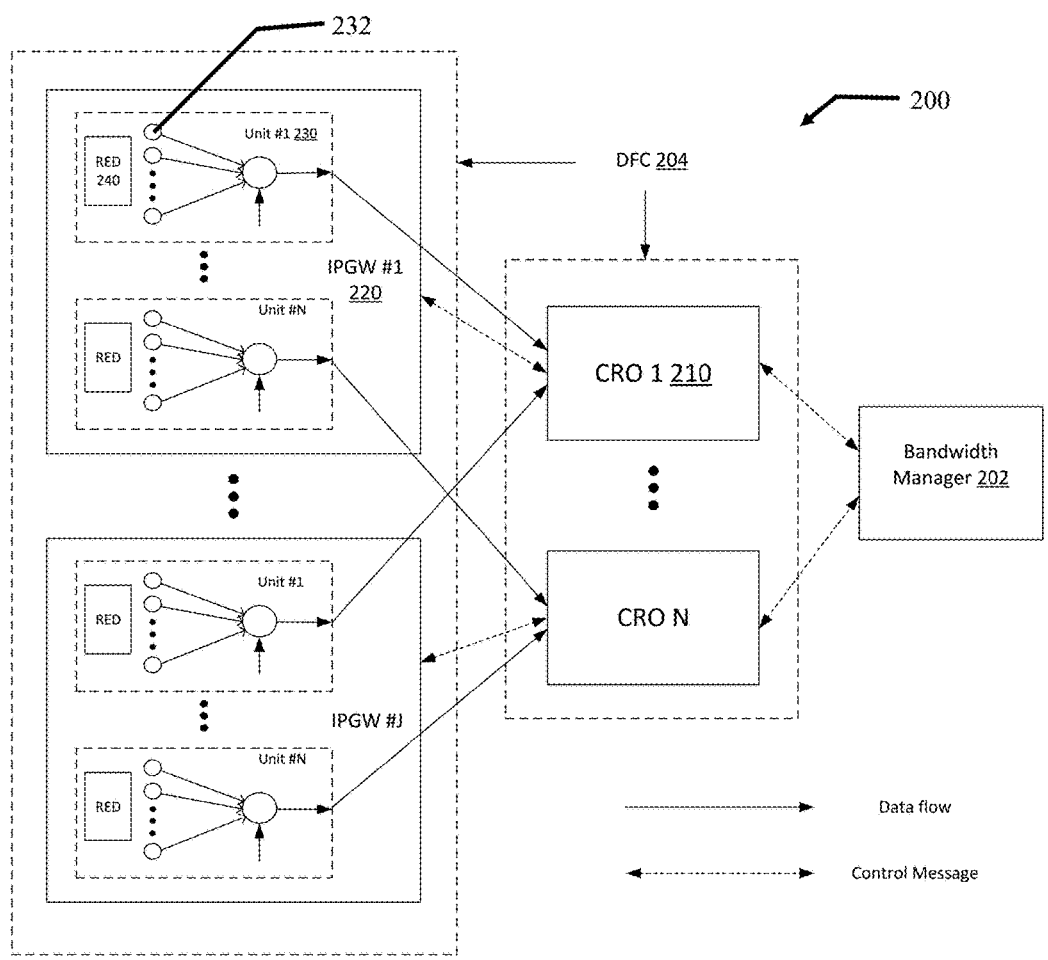
FIG. 2 illustrates a conceptual system of a Distributive Flow Control according to various embodiments.

FIG. 2 illustrates a conceptual system of a Distributive Flow Control according to various embodiments.

A Multi-IP Gateway (IPGW) Multi-Code Rate Organizer (CRO) System 200 may include a Distributive Flow Control (DFC) procedure 204. The DFC procedure 204 may work together or be integrated with a Bandwidth Manager 202. The DFC procedure 204 may be based on resource allocation and functions, such as, backlog report, scheduling and TCP congestion control, to provide distributed congestion control with high stability in the Multi-IPGW Multi-CRO system 200. In exemplary embodiments, the DFC procedure 204 may be based on the backlog report, scheduling and TCP congestion control provided by an IPGW 220. In exemplary embodiments, generic functions at the IPGW 220 and a CRO 210 may be implemented as disclosed in U.S. Pat. Nos. 8,929,217 and 8,705,357, and using multiple processing threads that run in parallel.

The Bandwidth Manager 202 receives/collects information of the demand and bandwidth allocation from the IPGWs 220 and CROs 210 at run-time to make decisions. For example, the BM 202 may reallocate and balance a capacity of the CRO 210 to IPGWs 220, if needed. Bandwidth allocation by the CRO 210, revised or adjusted by the BM 202, is sent to the IPGWs 220 for flow control purpose. The IPGW 220 may run flow control modules 232, such as, demand calculation, scheduling and TCP congestion control based on Random Early Detection (RED) 240, for terminals (terminal sessions) (see FIG. 4) in each connected CRO branch 230. In exemplary embodiments, the IPGW 220 may group terminals by the CRO branch 230 that they connect with.

The BM 202 may provide functionality, such as, a scheduling module, a demand request process module, and a TCP flow control module. In exemplary embodiments, these modules may be provided as one individual module 232 matching one CRO branch 230. The scheduling module, an instance of the individual module 230, schedules outbound requests. The demand request process module, an instance of the individual module 230, collects demand requests from each scheduler module and sends them to the CRO every flow control period. The TCP flow control module, an instance of the individual module 230, may provide Random Early Detection (RED) and Window Adjustment 240. The TCP flow control modules collects aggregate queueing and latency profile from each scheduling module and applies a TCP/RED method to push back traffic if needed. A Backlog Report module (not shown) and the RED/Flow Control modules 240 may be deployed as one for many schedulers or one for each scheduler.

Scheduling

Figure 3:
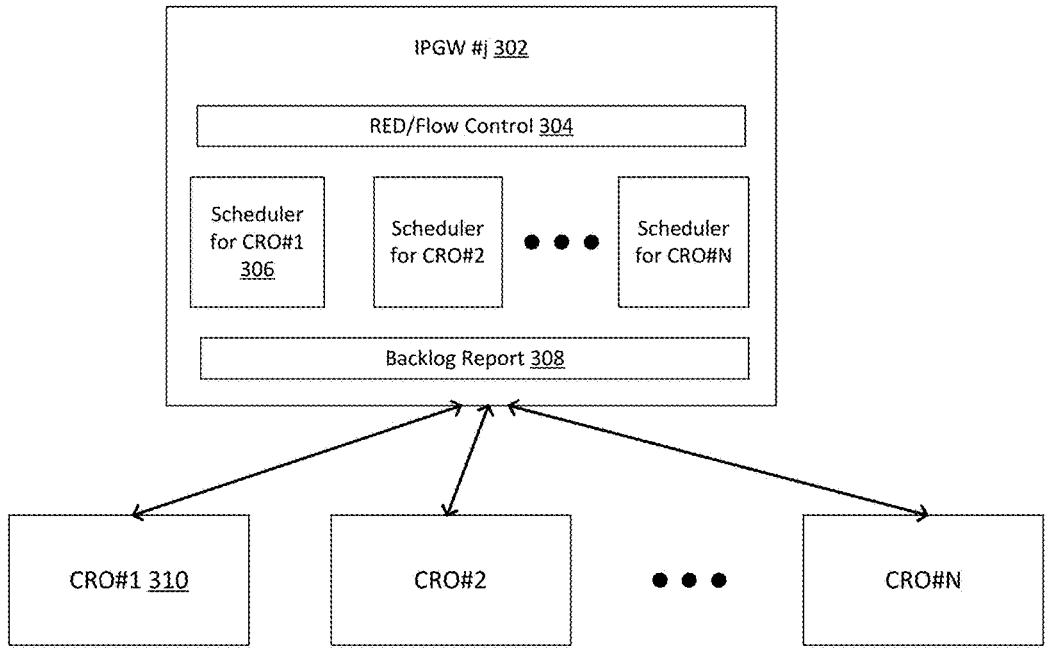
FIG. 3 illustrates a system using multiple schedulers according to various embodiments.

FIG. 3 illustrates a system using multiple schedulers according to various embodiments.

In exemplary embodiments, an IPGW 302 provides an individual scheduler 306 for each CRO 310 (outroute) that the IPGW is connected to manage traffic for terminals (not shown) associated with a respective CRO 310. The input for the scheduler 306 includes an offered capacity from the CRO. The output from the scheduler includes a demand request to the CRO and metrics to trigger the TCP/RED method for flow control. In exemplary embodiments, the scheduling threads run in parallel and independently with each other. In exemplary embodiments, the IPGW 302 also provides an IPGW-wide RED/Flow Control module and a backlog report 308.

Figure 4:
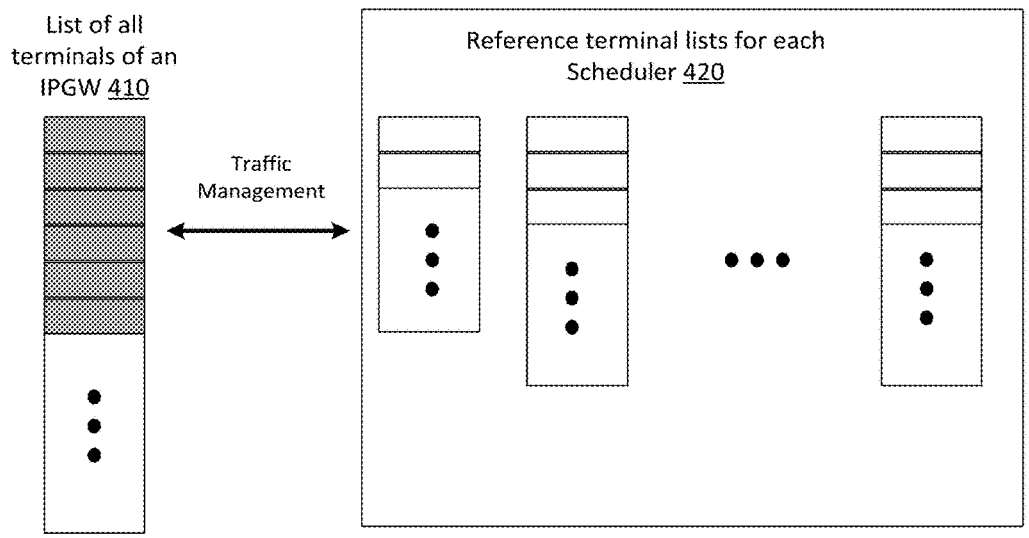
FIG. 4 illustrates management of terminals associated with an IPGW according to various embodiments.

FIG. 4 illustrates management of terminals associated with an IPGW according to various embodiments.

In exemplary embodiments, the Multi-IP Gateway (IPGW) Multi-Code Rate Organizer (CRO) System may maintain a list of all terminals 410 associated with an IPGW. As such, there may be multiple reference lists 420 of active terminals associated with each CRO servicing the IPGW. The IPGW may maintain the reference lists 420 by adding and removing terminals in the reference lists 420 subject to the terminal's activity status. Scheduling and queueing operation may be done for the terminals on each reference list. In exemplary embodiments, a scheduling process disclosed in U.S. Pat. No. 8,929,217 may be applied.

Backlog Report

In exemplary embodiments, the system may include a backlog report module 308 (see FIG. 3). The backlog report module 308 (also referred to as bandwidth request module/method) may collect the queueing profile of terminals in each reference list. A queueing profile may be calculated by the one or more schedulers. In exemplary embodiments, the calculation of queueing profile for a single scheduler may be performed as disclosed in U.S. Pat. No. 8,929,217. In exemplary embodiments, a plurality of schedulers may be performing concurrent calculations in multiple parallel threads that perform the tasks. The plurality of schedulers may be independent. Even when the plurality of schedulers is independent, the backlog report module 308 communicates with each scheduler to collect their respective demands. The backlog report module 308 may communicate the respective demands to the respective associated CROs.

IPGW Congestion Control

In exemplary embodiments, a TCP congestion control function may run across multiple scheduling threads. The TCP congestion control function takes the output from a scheduler (typically the estimated queueing delays) and applies it as an input to a RED/Window Adjustment method. In exemplary embodiments, the RED/Window Adjustment may be implemented using the process disclosed in U.S. Pat. No. 8,705,357. As the expected latencies maybe different per scheduler, the RED/Window Adjustment may run separately for terminals associated with different CROs. In exemplary embodiments, the IPGW congestion control function consists of multiple RED flow control methods that run independently and in parallel.

Bandwidth Management Across CROs

The Bandwidth Manager (BM) may provide Bandwidth Management across CROs. In exemplary embodiments, each IPGW sends the backlog report to the respective CROs, with one report per CRO. A CRO gets a backlog report from each IPGW on the particular branch of this CRO. In exemplary embodiments, the CRO makes independent bandwidth allocation, for example, by using the process described in U.S. Pat. No. 8,929,217. In some embodiments, the CRO sends the received backlog reports as well as the bandwidth allocation to the BM. The BM may receive inputs of backlog per IPGW per CRO, the bandwidth allocation per IPGW per CRO, the CIR (Committed Information Rate) of each IPGW, and the estimated capacity of each CRO. In some embodiments, when the IPGW's CIR is not exceeded, the BM makes no change to CRO's decision; otherwise, the BM revises and rebalances the CRO's bandwidth allocation to meet IPGW's CIR.

Input Variables

Suppose there are J IPGWs, N CROs and M types of traffic classes. Let $Q_{ij}(m)$ denote the demand of the m-th class from j-th IPGW to the i-th CRO, where m=1, ..., M, i=1, ..., N, and j=1, ..., J. In exemplary embodiments, M=3, for example, representing Interactive, Streaming and Bulk traffic types. Let $C_{ij}(m)$ be the per CRO assigned bandwidth from the i-th CRO to the j-th IPGW for priority m. Let $G_i$, for i=1, ..., N, denote the estimated CRO offered bandwidth for non-real-time (NRT) traffic. Let $A_j^{CIR}$, for j=1, ..., J, be the capacity limit (namely CIR) of j-th IPGW, which is preconfigured by the network. In exemplary embodiments, a CIR may limit the IPGW's throughput or prevent over allotment of bandwidth from CROs for the IPGW.

In exemplary embodiments, the Bandwidth Manager takes $Q_{ij}(m)$, $C_{ij}(m)$, $G_i$, i=1, ..., N, j=1, ..., J, m=1, ..., M, and $A_j^{CIR}$, j=1, ..., J, as inputs. The BM may adjust $C_{ij}(m)$ based on $A_j^{CIR}$ and $Q_{ij}(m)$ such that the IPGW's CIR limit is not exceeded. With these inputs, the total demand request from the j-th IPGW to the i-th CRO may be calculated as:

$$Q_{ij} = \sum_{m=1}^{M} Q_{ij}(m), i=1, \ldots, N, j=1, \ldots, J.$$

In exemplary embodiments, the CRO assigned bandwidth from the CRO i to the IPGW j may be calculated as:

$$C_{ij} = \sum_{m=1}^{M} C_{ij}(m), i=1, \ldots, N, j=1, \ldots, J.$$

Let $C_{ij}^{origin} = C_{ij}$ and the total capacity for i-th CRO may be calculated as:

$$C_{CRO,i} = \sum_{j=1}^{J} C_{ij} = \sum_{j=1}^{J} \sum_{m=1}^{M} C_{ij}(m), i=1, \ldots, N.$$

In exemplary embodiments, for a given capacity $G_i$ passed from the i-th CRO, $G_i = C_{CRO,i}$. In exemplary embodiments, the total assigned bandwidth for j-th IPGW may be calculated as:

$$C_{IPGW,j} = \sum_{i=1}^{N} C_{ij} = \sum_{i=1}^{N} \sum_{m=1}^{M} C_{ij}(m), j=1, \ldots, J.$$

In exemplary embodiments, the process may identify when an IPGW's CIR is exceeded, and corrected action may be taken. For example, the bandwidth manager may reallocate the bandwidth such that the CIR criteria are met. In exemplary embodiments, the IPGWs are split into two sets, a surplus set and a deficit set. The surplus set groups all the IPGWs where the CRO allocated bandwidth is more than the CIR, while in a deficit set the IPGW's that are assigned bandwidth smaller than its CIR are grouped.

Process on Overallotment

So if $C_{IPGW,j} > A_j^{CIR}$, for any j=1, ..., J, then put j in the surplus set, denoted as $Z^+$; if $C_{IPGW,j} > A_j^{CIR}$, then put j in the deficit set, denoted as $Z^-$. For overallotment, the process reallocates the capacity in $Z^+$ into $Z^-$ subject to CIR criteria.

When all IPGWs are in the deficit set, meaning the total allocated CRO bandwidth is smaller than CIR for all IPGWs, then no adjustment is needed. In other words, if the surplus set is empty, then CRO's bandwidth allocation is good enough. When all IPGWs are in surplus set, meaning the total allocated CRO bandwidth is larger than CIR for all IPGWs, then capacity is removed from IPGWs until the respective CIR is met. In exemplary embodiments, the re-allotment may use a proportional method. In some embodiments, the re-allotment may by performed by taking bandwidth away from IPGWs who get a higher allotment than their portion.

Method 1: Proportional Distribution

In some embodiments, the re-allotment may proportionally distribute the overallotment based on an effective demand for the allocated bandwidth. For $j \in Z^+$, the overallotment for j-th IPGW may be calculated as:

$$D_{IPGW,j}^+ = C_{IPGW,j} - A_j^{CIR}.$$

In some embodiments, first the allocated bandwidth is consolidated by true demand. The consolidation may be done by distributing to each associated CRO, and then the overallotment portion for CRO i in IPGW j may be calculated as:

$$D_{ij}^+ = \frac{C_{ij}}{C_{IPGW,j}} \cdot D_{IPGW,j}^+, i=1, \ldots, N, j \in Z^+.$$

The total overallotment attributed to CRO i may be calculated as a summation of $D_{ij}^+$ over $j \in Z^+$, given by:

$$D_{CRO,i}^+ = \sum_{j \in Z^+} D_{ij}^+,$$

i=1, ..., N, where $D_{CRO,i}^+$ is the portion that may be used for $Z^-$.

Method 2: Distribution with Backlog Based Fair Reservation

In this embodiment, if the bandwidth from a CRO is smaller than the corresponding fair usage of the IPGW, the bandwidth of the IPGW is not reduced for distributing overallotment. Rather, reduction of the overallotment is performed against the IPGW with a bandwidth allocation more than its fair usage.

As noted above, assume that $Q_{ij}$ is the total backlog for the j-th IPGW on the i-th CRO, i=1, ..., $N_j$, where $N_j$ is the number of CROs that the j-th IPGW is connected to. The distribution may partition the IPGW's CIR proportional to the respective backlog for each CRO, which respective backlog may be expressed and calculated as:

$$A_{ij}^Q = \frac{Q_{ij}}{\sum_{k=1}^{N_j} Q_{kj}} A_j^{CIR},$$

where $A_{kj}^Q$ is the targeted CIR portion of the j-th IPGW on the i-th CRO.

The criteria are: there is no reduction for CROs that are allocated bandwidth smaller than the targeted CIR portion; and for the CROs that are allocated bandwidth larger than the targeted CIR portion, an evenly distributed reduction is performed until the respective target proportion is met. For this purpose, in exemplary embodiments, a water-filling scheme or method may be applied.

Let $\{C_{kj}, k=1, \ldots, N_j\}$ be the allocated bandwidth for the j-th IPGW on the k-th CRO, $j \in Z^+$, and $N_j$ is the number of CROs connected to j-th IPGW. With this method, a fix portion (for example, 100 kbps) may be used for reduction from $C_{kj}$, $k=1, \ldots, N_j$, until resultant bandwidth ($C_{kj}$) meets $A_{kj}^Q$ or the total resultant bandwidth $$\left(\text{i.e. } \sum_{k=1}^{N_j} C_{kj}\right)$$

meets the CIR ($A_j^{CIR}$). Exemplary pseudo code for this may be as follows:

---

Let $C_{kj}^{update}$ be a temporary variable, $k = 1, \ldots, N_j$, and $C_j^{update}$ be the updated total bandwidth allocation.
Set $\Delta d$ = 100 kbps.

$$C_{kj}^{update} = C_{kj};\ C_j^{update} = \sum_{k=1}^{N_j} C_{kj}^{update};$$

While $C_j^{update} > A_j^{CIR}$ (// a = 0.5)
{
For k = 1, ..., $N_j$,
If $C_{kj}^{update} > (A_{kj}^Q + a \cdot \Delta d)$, (// a is configurable with default a = 0.5)
  $C_{kj}^{update}$ = max[0, $C_{kj}^{update} - \Delta d$];
  $C_j^{update} = C_j^{update} - \Delta d$;
If $C_j^{update} \leq A_j^{CIR}$, Exit While Loop.
End If
End If
End (//For loop)
} (//While Loop)

---

The resultant reduction of j-th IPGW on k-th CRO may be calculated as: $D_{kj} = C_{kj} - C_{kj}^{update}$. The total over allotment attributed to k-th CRO would be summation of $D_{kj}$ over $j \in Z^+$, that may be calculated as:

$$D_{CRO,k}^+ = \sum_{j \in Z^+} D_{kj},$$

$k=1, \ldots, N_j$, where $D_{CRO,k}^+$ is the portion that may be used for $Z^-$.

We present two examples to illustrate partial and full CRO congestion cases.

EXAMPLE 1

Let there be 4 CROs. CRO#3 is uncongested. All others may be congested.

Let $A_j^{CIR}$=1500 (unit: 100 kbps), $\{C_{kj}\}$=[500 200 1000 500], k=1, ..., 4, and $\{Q_{kj}\}$=[800 400 500 500], k=1, ..., 4.

$\{A_{kj}^Q\}$=[800 400 500 500]/(800+400+500+500)*1500= [545.5 272.7 340.9 340.9].

With the method, the resultant bandwidth allocation is
$C_{kj}^{update}$=[500 200 459 341];
$D_{kj}$=[0 0 541 159].

EXAMPLE 2

Let there be 4 CROs. All are congested.
$A_j^{CIR}$=1500 (unit: 100 kbps), $\{C_{kj}\}$=[400 300 450 700], k=1, ..., 4, and $\{Q_{kj}\}$=[800 400 500 800], k=1, ..., 4.
$\{A_{kj}^Q\}$=[480 240 300 480].
With the method, the resultant bandwidth allocation is
$C_{kj}^{update}$=[400 240 305 555];
$D_{kj}$=[0 60 145 145].

For the two methods, the second method has the merit that less allocated bandwidth is likely reserved and the allocated bandwidth for an uncongested CRO is likely removed if an IPGW's CIR is reached.

Redistribution Process

In exemplary embodiments, the process may distribute $D_{CRO,i}^+$, i=1, ..., N, to IPGWs in $Z^-$ in an iterative way. For notation convenience, one may define a connection matrix to mark down which IPGW is connected to which CRO. Given N CROs and J IPGWs, an N×J connection matrix is defined. Each element in the connection matrix may be set as either 1 or 0. The connection matrix may be denoted as $H = \{h_{ij}\}_{N \times J}$. If CRO i is connected to IPGW j, $h_{ij}$=1; otherwise, $h_{ij}$=0. For example, there are three IPGWs and two CROs. If each CRO is connected to every IPGW, then the connection matrix is:

$$H = \{h_{ij}\}_{2 \times 3} = \begin{bmatrix} 1 & 1 & 1 \\ 1 & 1 & 1 \end{bmatrix}.$$

Figure 5:
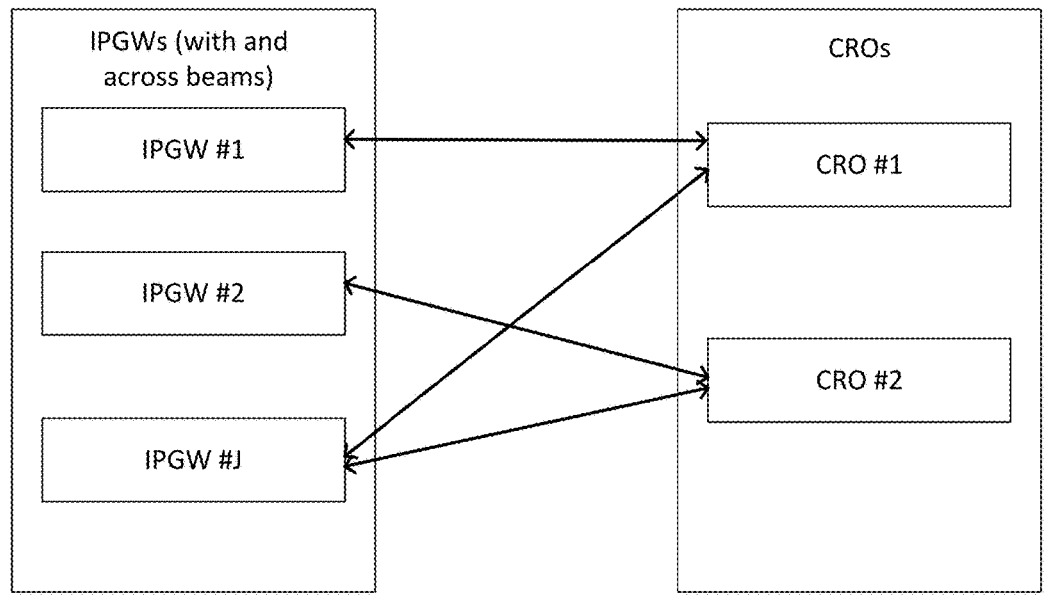
FIG. 5 illustrates exemplar connections between IPGWs and CROs.

FIG. 5 illustrates exemplar connections between IPGWs and CROs. For the connections illustrated in FIG. 5, the connection matrix captures the missing connections between IPGW #1 and CRO #2, and IPGW #2 and CRO #1 with a 0 in the respective cell of the connection matrix, and may be filled as:

$$H = \{h_{ij}\}_{2 \times 3} = \begin{bmatrix} 1 & 0 & 1 \\ 0 & 1 & 1 \end{bmatrix}.$$

The process may then for each $D_{CRO,i}^+$, i=1, ..., N, distribute a constant amount of bandwidth to each IPGW in $Z^-$ that is connected to this CRO. The process may sort $D_{CRO,i}^+$ based on the number of connected IPGWs. In exemplary embodiments, the process may prioritize a CRO with a smaller number of connections. In exemplary embodiments, this may be achieved by sorting the summation of the elements of each row in matrix H. Based on the sorting list, the distribution of CRO surplus circulates IPGWs in $Z^-$ and stops on an IPGW until the accumulated bandwidth allocation of this IPGW achieves its total demand or CIR. Such distribution continues until the surplus bandwidth is used out or the demand or CIR is met. The bandwidth of a CRO may be all given out to IPGWs. In exemplary embodiments, this process runs with the same periodicity (for example, 100 ms) as CRO bandwidth allocation. In some embodiments, this process may be run with a shorter periodicity, for example, every 50 ms, in an effort to reduce the lag between IPGWs and CROs. In exemplary embodiments, the periodicity of the redistribution process may be set as a configuration parameter. Exemplary pseudo code for this may be as follows:

(1). Generate a sort list of surplus CROs based on the number of connected IPGWs, denoted as $N_{sort}$. A CRO with a smaller number is on the top of the list.
(2). Use a constant portion, $\Delta d$, for example, 100 kbps.
    For $i \in N_{sort}$,
    While ($D_{CRO,i}^+ > 0$ or All CIRs are met)
    For j $j \in Z^-$ (circulate $j \in Z^-$)
    If $h_{ij} == 1$, then $C_{ij} = C_{ij} + \Delta d$;
    if $C_{ij} \geq Q_{ij}$, stop assigning bandwidth to j-th IPGW;

if $C_{IPGW,j} = \sum_{i=1}^{N} C_{ij} \geq A_j^{CIR}$, stop assigning bandwidth to j-th IPGW and take it out of $Z^-$.
    $D_{CRO,i}^+ = D_{CRO,i}^+ - \Delta d$. If $D_{CRO,i}^+ \leq 0$, break (\\ break while()).
    End (\\ end For j loop)
    For i-th CRO, if the updated $D_{CRO,i}^+$ is still larger than 0, then distribute it in unit of $\Delta d$ over all the IPGWs in $Z^-$ of which the CIR is not met until $D_{CRO,i}^+$ becomes zero or all CIRs are met. Update $C_{ij}$, $D_{CRO,i}^+$ and $C_{IPGW,j}$ when $\Delta d$ is distributed. Also record $d_{ij}$ as the portion of re-allocated bandwidth from i-th CRO.
    (Optional)
    IF ALL CRO capacity has to be used and ALL IPGW CIRs are met
    Then BM keeps on allocation CRO bandwidth from $D_{CRO,i}^+$ to all connected IPGWs in a round robin way until used out.
    End (\\ end while())
    End (\\ end For (i) loop)
Next we update the variables after re-allocation.
Recall the original bandwidth allocation $C_{ij}^{origin}$ and $d_{ij}$, the portion of bandwidth re-allocated from i-th CRO to j-th IPGW, $i \in N$, and $j \in Z^-$.
For $j \in Z^-$, $C_{ij}^{update} = C_{ij}^{origin} + d_{ij}$.
For $j \in Z^+$, $C_{ij}^{update} = C_{ij}^{origin} - D_{ij}^+$, $D_{ij}^+$ is previously calculated over allotment portion for CRO i in IPGW j. In both cases, $C_{ij}^{update}(m) = \dfrac{C_{ij}(m)}{C_{ij}} \cdot C_{ij}^{update}$, $m = 1, \ldots, M$.

The Bandwidth Manager then passes the updated bandwidth allocation $\{C_{ij}^{update}(m), m = 1, \ldots, M\}$ from i-th CRO to j-th IPGW to the corresponding CROs, $i \in N$, $j \in J$.

Table 1 lists an exemplary list of variables that may be communicated between a CRO and the BM in messages.

| Notation | Name | Unit | Sending Component | Comment |
|---|---|---|---|---|
| $Q_{ij}(m)$ | Backlog report | kbps | CRO (forwarded from IPGW to BM by CRO) | i: index for CRO, $i = 1, \ldots, N$. j: index for IPGW, $j = 1, \ldots, J$. m: index for priority, $m = 1, \ldots, M$. |
| $C_{ij}(m)$ | CRO calculated NRT bandwidth allocation | kbps | CRO | Calculated by CRO; same definition of i, j, m. |
| $G_i$ (optional) | CRO's NRT (non-real-time) capacity | Kbps | CRO | Estimated by CRO $\left(\text{note } G_i = \sum_{j=1}^{J} \sum_{m=1}^{M} C_{ij}(m)\right)$; only for verification purpose. Same i, j, m. |
| $C_{ij}^{update}(m)$ | Updated CRO bandwidth allocation | kbps | BM | Calculated by BM; same i, j, m. |

Exemplary Protocol Between a CRO and Bandwidth Manager:

In exemplary embodiments, the CROs forward $Q_{ij}(m)$, and also send the calculated $G_i$ and $C_{ij}(m)$ to the BM. Here, i is the index for CROs, $i=1, \ldots, N$; j is the index for IPGWs, $j=1, \ldots, J$; and m is the index for priorities, $m=1, \ldots, M$. The BM calculates $C_{ij}^{update}(m)$ and sends it to the CROs. Within a flow control period (typically 100 ms), a CRO sends the most recent $C_{ij}^{update}(m)$ to the IPGWs. When a CRO does not get an update, it may use the old values for certain periods (for example, 3 periods), and then CRO may start to use its own calculations. This pattern may continue until the CRO gets an update from the BM.

Dynamic CRO-IPGW Topology Learning

The interconnections between IPGWs and CROs may not necessarily be symmetrical. See, for example, FIG. 5. The interconnections may be non-symmetrical, that is, a certain connection between an IPGW and a CRO may not exist. An unconnected branch may be either predictable or unpredictable. From the BM's point of view, the situation may be a bit complex because the BM's view of interconnections needs to be robust enough to tolerate anomalies, such as, CRO/IPGW failure, misconfiguration, unpredictable non-symmetrical connections, etc.

In exemplary embodiments, to cope with the dynamic interconnection, a BM may utilize a dynamic topology learning process. In some embodiments, the BM monitors heartbeat responses from the CROs and dynamically figures out the connection topology that is usable for BM's bandwidth management.

In exemplary embodiments, the Bandwidth Manager operates at the Resource Pool level. A resource pool refers to a combined set of IPGWs and CROs. A terminal is offered to choose a CRO and be associated with an IPGW in a same resource pool. When there are multiple Resource Pools in a beam, there will be multiple BM threads running at a physical BM. A beam may have only one physical BM.

The Bandwidth Manager sends a heartbeat to a CRO requesting needed information to performance bandwidth management. The Bandwidth Manager learns the CRO-IPGW connection topology via the heart beat/response messages between the BM and CROs. In some embodiments, the message for the BM to derive topology is the backlog report from the IPGW to the CRO. If an IPGW is connected to a CRO (and is alive), the IPGW may send a backlog report (generally non-zero values) to the CRO in response to the CRO's request. If the live connection between an IPGW and a CRO is not there, then CRO does not receive the backlog report. Upon the request of the BM, the CRO may forward the IPGW's backlog report to the BM. As a result, from a CRO's forwarded IPGWs' backlog reports, the CRO actually tells the BM which IPGWs it is connected to.

The BM (thread) learns the CRO-IPGW connection topology dynamically via the heartbeat/response messages. These messages may have a periodicity of 100 ms. In exemplary embodiments, the BM updates the topology at a multiple of 100 ms intervals, for example, every 5000 ms. During the interval between updates, the topology is assumed valid.

Figure 6:
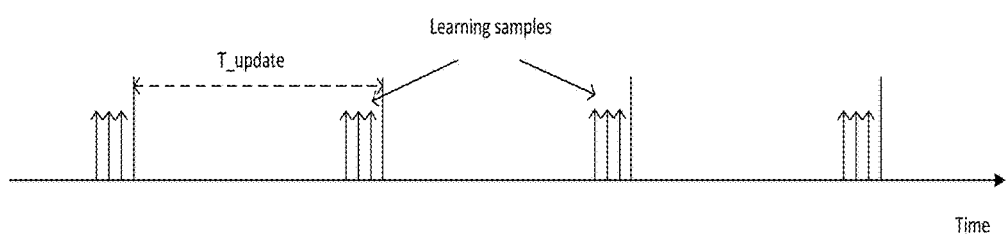
FIG. 6 illustrates intervals used for topology learning, according to various embodiments.

FIG. 6 illustrates intervals to be used for topology learning, according to various embodiments.

Let $T_0$ and $T_{update}$ be the BM's heartbeat period and topology update interval, respectively. In exemplary embodiments, the default values are $T_0$=100 ms and $T_{update}$=50 $T_0$. In topology learning, during a configurable period before the start of $T_{update}$, the BM analyzes the received heartbeat response samples from a CRO including the IPGWs' backlog reports with this particular CRO. These samples may be received after intervals of $T_0$. Multiple samples may used such that a missing sample would not cause topology error. Let the number of samples be denoted as $K_{sample}$, with a default value of $K_{sample}$=3.

Figure 7:
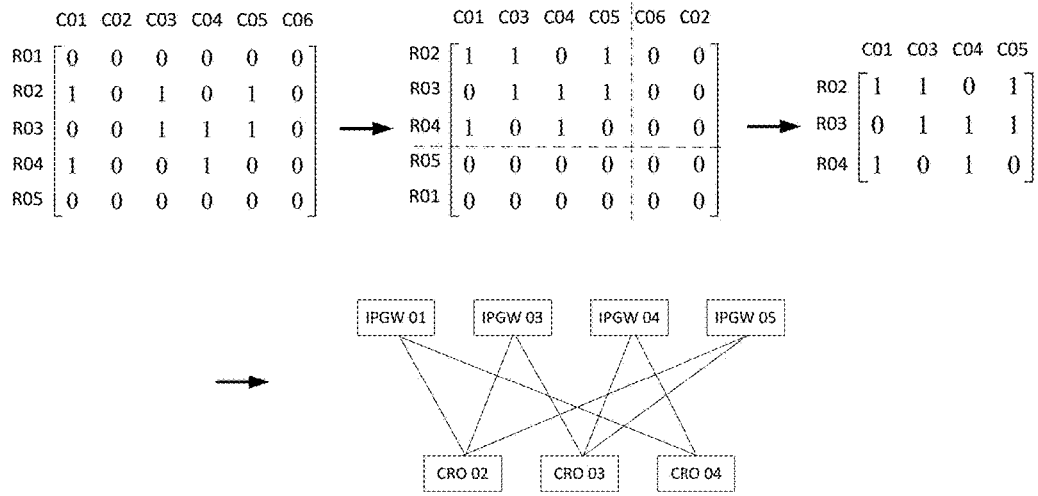
FIG. 7 illustrates an exemplary connection matrix learning process according to various embodiments.

FIG. 7 illustrates an exemplary connection topology to be learned according to various embodiments.

Figure 8:
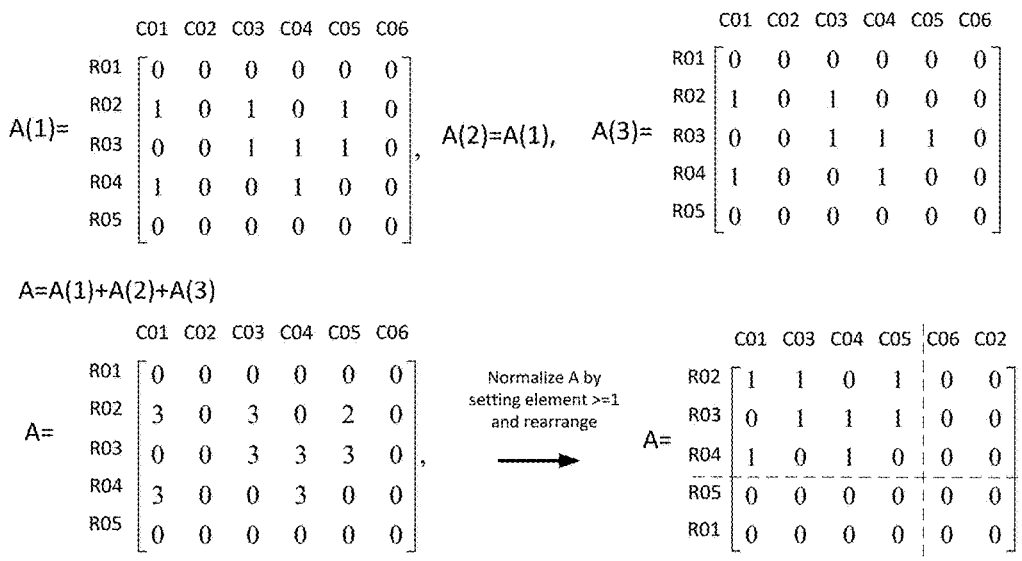
FIG. 8 illustrates an exemplary connection matrix learning process according to various embodiments.

FIG. 8 illustrates an exemplary connection matrix learned by a BM according to various embodiments.

The Bandwidth Manager is pre-configured with all possible CROs and IPGWs in a certain resource pool, including those for redundancy. Each CRO or IPGW has a unique ID. The BM forms an initial matrix where all rows represent a CRO connecting the IPGWs and all columns representing an IPGW connecting the CROs. The initial matrix has all elements as "0".

In each sampling period, when the BM receives a CRO's response, the BM sets the element corresponding to an IPGW as "1" if the backlog is reported on that IPGW (even if zero backlog). The CRO differentiates a non-connected IPGW from a connected IPGW with zero backlog. So a connected IPGW may be marked as "1", while a non-connected IPGW may be marked as "0". If the backlog from a IPGW is missing, then the CRO may mark it as "non-connected".

In receiving all CROs' response messages, the BM may set up a matrix with elements of "1"s and "0"s at a single sampling period. Such matrix is referred to as an Elementary Matrix. With multiple sampling periods, the BM may have multiple elementary matrixes. By summing up these matrixes, the BM obtains a new matrix with non-zero and zero elements. Then by comparing a threshold, i.e., if an element is larger than the threshold, set as "1"; otherwise, set as "0", then an matrix with "1"s and "0"s may be obtained again.

FIG. 7 illustrates an exemplary connection matrix after one sampling matrix has been collected, while FIG. 8 demonstrates an exemplary connection matrix after three sampled elementary matrixes are collected and summed up. In FIG. 8, the threshold is 1, meaning if an element is larger or equal to one, then it is set to as "1"; otherwise, it is set as "0". In exemplary embodiments, use of multiple samples may provide improved reliability and flexibility. In some embodiments, the default threshold value is $e_{th}$=1.

Given the learned IPGW-CRO connection topology, the BM assumes this topology is valid during the update interval (e.g., 5000 ms). The BM verifies that the received CRO messages match with the topology. If a match is found, the BM performs bandwidth management across the CROs; otherwise, the BM may stop performing bandwidth management until the next updating interval.

In some embodiments, a message from the IPGW to CRO or from the CRO to BM may be lost. For example, if a message is lost in a bandwidth management period ($T_0$), the BM may uses the previous message for consecutive K (for example, K=3) times until all messages arrive or the topology is updated. In exemplary embodiments, the criteria of using previous messages only applies to the normal operating functions of the bandwidth management, but not for the Topology Learning process. In exemplary embodiments, the Topology Learning process uses raw original messages and a missing message is not replaced with a previous message.

Exemplary Use Case 1: If a CRO is on the topology and actually not broken, when the CRO's message is lost, the BM uses the previous message for K (K=3) consecutive 100 ms periods and then stops doing bandwidth management until all CRO messages are received.

Exemplary Use Case 2: If a CRO is on the topology and actually broken, when the CRO's message is lost, the BM uses the previous message for K (K=3) consecutive 100 ms periods and then stop doing bandwidth management. After 5000 ms, the topology will be updated via heartbeat/response to exclude the broken CRO. The BM will then perform bandwidth management based on the updated topology.

Exemplary Use Case 3: If a CRO is newly added during the 5000 ms interval, the BM would learn from the heartbeat/response message from the new CRO that the topology is not met. The BM will not do bandwidth management until the topology is updated.

In exemplary embodiments, a missing CRO message may largely impact the dynamic load balancing. Thus, the topology may be updated promptly. Similar anomaly scenarios may happen when the IPGWs are newly added or removed. In exemplary embodiments, the case of a missing IPGW message may be intuitively OK compared to the loss of a CRO message. This is because the CRO may have anomaly handling on IPGW messages.

Since adding a new IPGW or an IPGW failure is rare, we may still follow the learned topology. If a violation to topology in terms of IPGW occurs, the BM stops performing bandwidth management until IPGW connections have been updated. In exemplary embodiments, this may leave the CRO to manage bandwidth independently until topology has been updated.

In exemplary embodiments, any dimensional mismatch may be considered an anomaly. For example, if the topology dimension of CRO is 3, but 2 or 4 CROs respond, it is a dimensional mismatch; similarly, if the topology dimension of IPGW is 4, and 3 or 5 IPGWs respond to CROs, it is also a dimensional mismatch. After tolerating the case of a lost message, in exemplary embodiments, dimensional mismatch may trigger the BM to stop bandwidth management until a topology update. However, in certain scenarios, for example, upon the operator's preference, the BM may keep using the existing topology until the completion of the next update.

The following examples illustrate the proposed approach. Suppose CROs R02, R03, and R03 are selectively connected to IPGWs C01, CO3, C04 and C05 as shown in FIG. 7 and represented by topology matrix $$A_{topo} \text{ as: } A_{topo} = \begin{bmatrix} 1 & 1 & 0 & 1 \\ 0 & 1 & 1 & 0 \\ 1 & 0 & 1 & 0 \end{bmatrix}.$$

Recall $Q_{ij}$ is the reported backlog of the j-th IPGW to the i-th CRO. If the backlog shows more than 4 IPGWs or more than 3 CROs, then it is a mismatch. A missing CRO report may be treated using the process described above. If the dimension matches, but the non-connection element shows a value, then it is still considered a dimensional mismatch or anomaly. For example, the connection matrix having the values $$Q(1) = \begin{bmatrix} 10 & 12 & -1 & 21 \\ -1 & 10 & 10 & -1 \\ 15 & -1 & 0 & -1 \end{bmatrix}$$

is considered a match (for demonstration purposes, we use "−1" to represent a non-connection in the backlog; a "0" backlog is possible for a IPGW.) However, a $$Q(2) = \begin{bmatrix} 10 & 12 & -1 & 21 \\ -1 & 10 & 10 & 20 \\ 15 & -1 & 0 & -1 \end{bmatrix}$$

is a mismatch because $Q_{24}=20$. $Q_{24}=20$ is a non-connection due to the non-connected element in the connection topology for that cell.

In exemplary embodiments, one possible method for determining mismatch is: If $Q_{ij} \geq 0$, $e_{ij}=1$; else $e_{ij}=0$. As such, a matrix $E_{topo}=\{e_{ij}\}$ may be obtained or calculated. By comparing whether $E_{topo}-A_{topo}=\{0\}$ the process may determine a match or mismatch. If all elements are zero, it is match; otherwise, it is a mismatch. If all elements are zero, the summation of all elements is also zero. So using the summation of all elements of $E_{topo}-A_{topo}$ determines the match or mismatch. In some embodiments, an alternative numerical calculation may be used. For example, as long as other criteria are met, a straight forward comparison and calculation between a CRO's message and the topology may be simpler and more effective.

Figure 9:
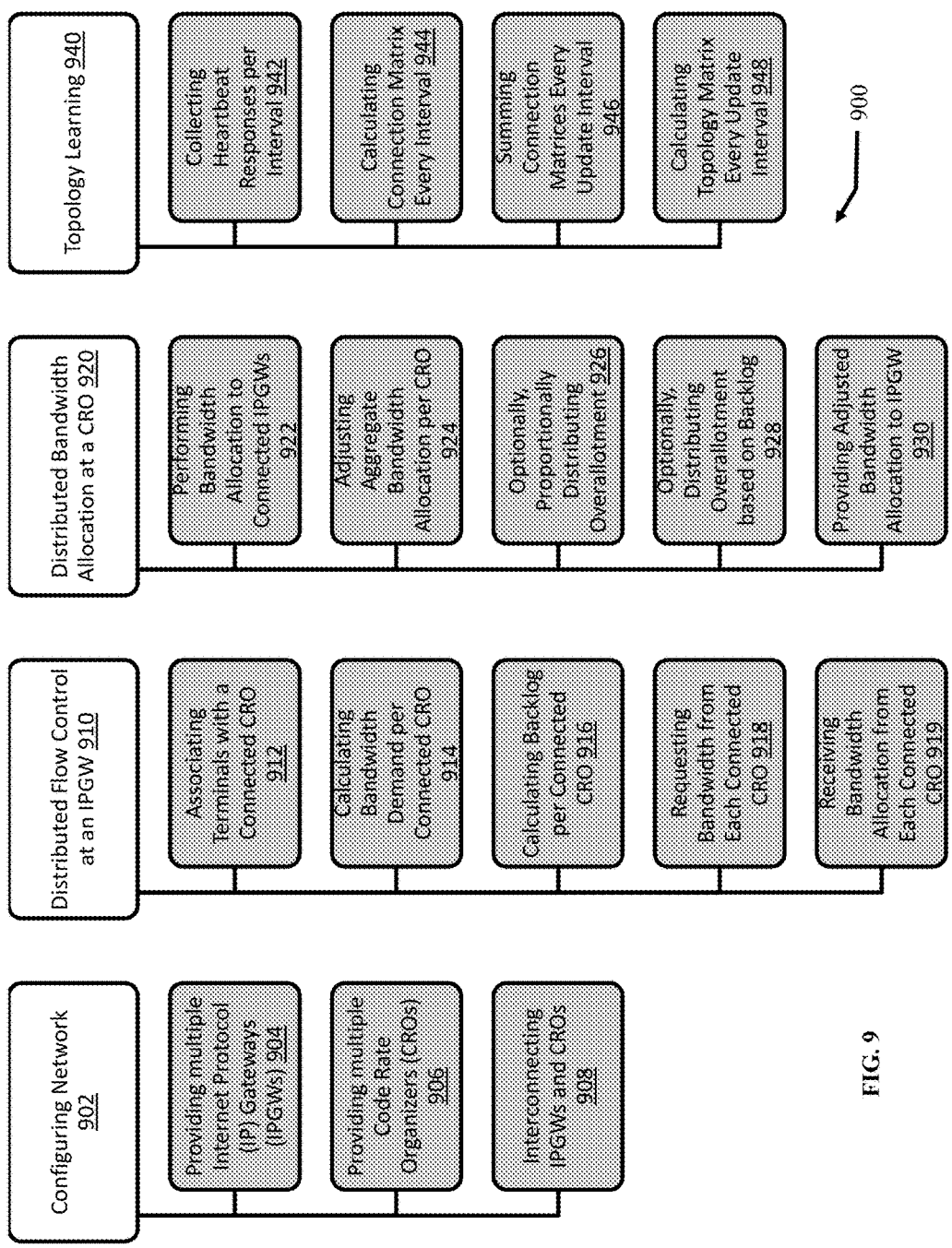
FIG. 9 illustrates a method for distributive flow control and bandwidth management in networks according to various embodiments.

FIG. 9 illustrates a method for distributive flow control and bandwidth management in networks according to various embodiments.

A method 900 for distributive flow control and bandwidth management in networks may be implemented using the modules and processes described above. The method 900 may include a process/step 902 for configuring a network. The method 900 may include a step 904 for providing Multiple Internet Protocol (ip) Gateways (IPGWs). The method 900 may include a step 906 for providing multiple code rate organizers (CROs). The method 900 may include a step 908 for interconnecting IPGWs and CROs.

The method 900 may include a process/step 910 for distributed flow control at an IPGW. The method 900 may include a step 912 for associating terminals with a connected CRO. The method 900 may include a step 914 for calculating bandwidth demand per connected CRO. The method 900 may include a step 916 for calculating backlog per connected CRO. The method 900 may include a step 918 for requesting bandwidth from each connected CRO. The method 900 may include a step 919 for receiving bandwidth allocation from each connected CRO.

The method 900 may include a process/step 920 for distributed bandwidth allocation at a CRO. The method 900 may include a step 922 for performing bandwidth allocation to connected IPGWs. The method 900 may include a step 924 for adjusting aggregate bandwidth allocation per CRO. The method 900 may include a step 926 for optionally, proportionally distributing overallotment. The method 900 may include a step 928 for optionally, distributing overallotment based on backlog. The method 900 may include a step 930 for providing adjusted bandwidth allocation to IPGW.

The method 900 may include a process/step 940 for topology learning. The method 900 may include a step 942 for collecting heartbeat responses per interval. The method 900 may include a step 944 for calculating connection matrix every interval. The method 900 may include a step 946 for summing connection matrices every update interval. The method 900 may include a step 948 for calculating topology matrix every update interval.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method for distributive flow control and bandwidth management in networks, the method comprising:
 providing multiple Internet Protocol (IP) Gateways (IP-GWs) that each have a maximum send rate and one or more sessions with associated throughput criteria, wherein each IPGW performs flow control by limiting information flows by the respective maximum send rate and throughput criteria;
 providing multiple Code Rate Organizers (CROs) that each have a bandwidth capacity, wherein each CRO performs bandwidth allocation of its respective bandwidth capacity to one or more IPGWs of the multiple IPGWs;

interconnecting the multiple IPGWs with the multiple CROs; and performing bandwidth management across the multiple CROs and IPGWs, wherein an IPGW of the multiple IPGWs provides flow control across a plurality of CROs of the multiple CROs, and an CRO of the multiple CROs allocates bandwidth to a plurality of IPGWs of the multiple IPGWs, and the performing bandwidth management comprises adjusting a bandwidth allocation by one of the multiple CROs and sending the adjusted bandwidth allocation to one or more of the multiple IPGWs.

2. The method of claim 1, wherein the interconnecting is a partial interconnecting of the multiple IPGWs with the multiple CROs.

3. The method of claim 1, wherein an IPGW of the multiple IPGWs provides individual flow control on a per CRO basis for a plurality of CROs of the multiple CROs.

4. The method of claim 1, wherein an IPGW of the multiple IPGWs provides independent flow control, and a CRO of the multiple CROs performs independent bandwidth allocation.

5. The method of claim 1, wherein the performing bandwidth management comprises coordinating bandwidth partitioning of a CRO of the multiple CROs across a plurality of IPGWs of the multiple IPGWs to meet the throughput criteria.

6. The method of claim 1, wherein the performing bandwidth management comprises limiting an aggregate bandwidth allocated to an IPGW of the multiple IPGWs from the multiple CROs to not exceed the respective maximum send rate of the IPGW of the multiple IPGWs.

7. The method of claim 1, wherein the performing bandwidth management comprises:
receiving, from the multiple CROs, bandwidth requests of the IPGWs and corresponding bandwidth allocations by each of the multiple CROs, and
adjusting the bandwidth allocations of the multiple CROs' to limit an aggregate bandwidth allocated to an IPGW of the multiple IPGWs from the multiple CROs to not exceed the respective maximum send rate of the IPGW of the multiple IPGWs.

8. The method of claim 1, wherein the performing bandwidth management comprises allocating resources to provide distributed congestion control based on a backlog report scheduling and TCP congestion control provided by an IPGW of the multiple IPGWs.

9. The method of claim 1, further comprising dynamically learning interconnections between the multiple IPGWs and the multiple CROs.

10. The method of claim 1, wherein a CRO of the multiple CROs comprises an outroute stream system of a satellite communications system.

11. The method of claim 1, wherein a CRO of the multiple CROs services a first satellite that is different than a second satellite serviced by a remaining CROs of the multiple CROs.

12. The method of claim 1, wherein the multiple IPGWs are not collocated.

13. A system for distributive flow control and bandwidth management in networks, the system comprising:
multiple Internet Protocol (IP) Gateways (IPGWs) that each have a maximum send rate and one or more sessions with associated throughput criteria, wherein each IPGW performs flow control by limiting information flows by the respective maximum send rate and throughput criteria;
multiple Code Rate Organizers (CROs) that each have a bandwidth capacity, wherein each CRO performs bandwidth allocation of its respective bandwidth capacity to one or more IPGWs of the multiple IPGWs; and
a bandwidth manager to perform bandwidth management across the multiple CROs and IPGWs,
wherein
the multiple IPGWs are interconnected with the multiple CROs, and
an IPGW of the multiple IPGWs provides flow control across a plurality of CROs of the multiple CROs, and a CRO of the multiple CROs allocates bandwidth to a plurality of IPGWs of the multiple IPGWs, and
the bandwidth manager adjusts a bandwidth allocation by one of the multiple CROs and sends the adjusted bandwidth allocation to one or more of the multiple IPGWs.

14. The system of claim 13, wherein the multiple IPGWs are partially interconnected with the multiple CROs.

15. The system of claim 13, wherein an IPGW of the multiple IPGWs is configured to provide individual flow control on a per CRO basis for a plurality of CROs of the multiple CROs.

16. The system of claim 13, wherein an IPGW of the multiple IPGWs is configured to provide independent flow control, and a CRO of the multiple CROs is configured to perform independent bandwidth allocation.

17. The system of claim 13, wherein the bandwidth manager coordinates bandwidth partitioning of a CRO of the multiple CROs across a plurality of IPGWs of the multiple IPGWs to meet the throughput criteria.

18. The system of claim 13, wherein the bandwidth manager limits an aggregate bandwidth allocated to an IPGW of the multiple IPGWs from the multiple CROs to not exceed the respective maximum send rate of the IPGW of the multiple IPGWs.

19. The system of claim 13, wherein the bandwidth manager:
receives, from the multiple CROs, bandwidth requests of the IPGWs and corresponding bandwidth allocations by each of the multiple CROs, and
adjusts the bandwidth allocations of the multiple CROs' to limit an aggregate bandwidth allocated to an IPGW of the multiple IPGWs from the multiple CROs to not exceed the respective maximum send rate of the IPGW of the multiple IPGWs.

20. The system of claim 13, wherein the bandwidth manager allocates resources to provide distributed congestion control based on a backlog report scheduling and TCP congestion control provided by an IPGW of the multiple IPGWs.

21. The system of claim 13, further comprising a topology module to dynamically learn interconnections between the multiple IPGWs and the multiple CROs.

22. The system of claim 13, wherein a CRO of the multiple CROs comprises an outroute stream system of a satellite communications system.

23. The system of claim 13, wherein a CRO of the multiple CROs services a first satellite that is different than a second satellite serviced by a remaining CROs of the multiple CROs.

24. The system of claim 13, wherein the multiple IPGWs are not collocated.

25. A method for distributive flow control and bandwidth management in networks, the method comprising:
providing multiple network gateways that each have a maximum send rate and one or more sessions with associated throughput criteria, wherein each network gateway performs flow control by limiting information flows by the respective maximum send rate and throughput criteria;
providing multiple access channels that each have a bandwidth capacity, wherein each access channel performs bandwidth allocation of its respective bandwidth capacity to one or more network gateways of the multiple network gateways;
interconnecting the multiple network gateways with the multiple access channels; and
performing bandwidth management across the multiple access channels and network gateways,
wherein a network gateway of the multiple network gateways provides flow control across a plurality of access channels of the multiple access channels, and an access channel of the multiple access channels allocates bandwidth to a plurality of network gateways of the multiple network gateways, and
the performing bandwidth management comprises adjusting a bandwidth allocation by one of the multiple access channels and sending the adjusted bandwidth allocation to one or more of the multiple network gateways.

* * * * *